United States Patent
Marion et al.

(10) Patent No.: US 7,818,582 B2
(45) Date of Patent: Oct. 19, 2010

(54) SINGLE SIGN-ON WITH COMMON ACCESS CARD

(75) Inventors: Donald E. Marion, Washington, DC (US); Andrew W. Jewell, Dallas, TX (US)

(73) Assignee: Accenture Global Services GmbH, Schaffhausen (CH)

( * ) Notice: Subject to any disclaimer, the term of this patent is extended or adjusted under 35 U.S.C. 154(b) by 1129 days.

(21) Appl. No.: 11/166,343

(22) Filed: Jun. 27, 2005

(65) Prior Publication Data

US 2006/0031683 A1  Feb. 9, 2006

Related U.S. Application Data

(60) Provisional application No. 60/582,664, filed on Jun. 25, 2004.

(51) Int. Cl.
G06F 21/00 (2006.01)
(52) U.S. Cl. .............. 713/185; 713/168; 726/8
(58) Field of Classification Search ............ 726/8; 713/168, 185
See application file for complete search history.

(56) References Cited

U.S. PATENT DOCUMENTS

| | | |
|---|---|---|
| 6,421,768 B1 | 7/2002 | Purpura |
| 6,973,581 B2 * | 12/2005 | Chung et al. .............. 726/13 |
| 7,278,026 B2 * | 10/2007 | McGowan .................. 713/186 |
| 7,296,290 B2 * | 11/2007 | Barriga et al. .............. 726/8 |
| 7,353,281 B2 * | 4/2008 | New et al. .................. 709/229 |
| 7,509,499 B2 * | 3/2009 | von Mueller et al. ........ 713/185 |
| 2001/0045451 A1 | 11/2001 | Tan et al. |
| 2003/0182551 A1 * | 9/2003 | Frantz et al. ................ 713/170 |

OTHER PUBLICATIONS

International Search Report dated Nov. 8, 2005 for International Application No. PCT/US2005/023052.

* cited by examiner

*Primary Examiner*—Kambiz Zand
*Assistant Examiner*—Amare Tabor
(74) *Attorney, Agent, or Firm*—Finnegan, Henderson, Farabow, Garrett & Dunner, L.L.P.

(57) ABSTRACT

A mechanism eliminates the number of times a user must login to individual services after initially logging into a computer system. A user only logs once into a computer system, and subsequent login requests by multiple services are handled automatically and transparently by the system. In one implementation, a user need only present a card to a card reader and enter a PIN, and the user is logged-in after presenting the card and a valid PIN. The system generates a token that is valid for this particular login session of the user, and when the user accesses a permissioned service, the system automatically logs-in the user to the application using the token. The system can perform the automatic login the user to a variety of applications including legacy applications, web-enabled applications, and commercial, off-the-shelf applications.

25 Claims, 3 Drawing Sheets

SINGLE SIGN-ON WITH COMMON ACCESS CARD

CROSS REFERENCE TO RELATED APPLICATIONS

This application claims priority under 35 U.S.C. 119(e) to U.S. Provisional Application No. 60/582,664 filed on Jun. 25, 2004, the subject matter of which is hereby incorporated by reference in full.

BACKGROUND OF THE INVENTION

1. Field of the Invention

This application relates generally to verifying a user's identity in a computer system. Certain implementations relate more particularly to simplifying and enabling seamless access to commercial and legacy applications using a Department of Defense ("DOD") common access card ("CAC"). These implementations may provide a seamless login experience to back-end applications, while meeting DOD security policies and regulations. These implementations may provide a central authentication gateway and various agents/adapters to pass login credentials to various types of back-end applications (for example, web-enabled, non-web-enabled, commercial off-the shelf ("COTS"), and custom government applications).

2. Discussion of the Related Art

Business applications traditionally require a user to login by providing information to verify the user's identity (typically account name and password). Because a user typically needs access to multiple applications to perform the user's job, the user is typically required to perform multiple separate and disparate logins to different applications. For example, a user may be required to navigate multiple logins to different systems to use an accounting application, retrieve a long-term contract, or view demand/supply forecasts. This process may be quite cumbersome and disjointed from a usability perspective if the user must maintain, remember, and/or try to synchronize account names and passwords across disparate applications. This process is particularly problematic where the desired applications (or the associated needed data) are accessed through disparate locations, such as locally, on a local network, and over the Internet, as commonly occurring in large organizations such as the government.

Additionally, DOD has mandated that all agencies deploy DOD CACs to access government business systems. Compliance with this mandate may require various agencies to deploy public key infrastructure ("PKI") solutions that read, validate, verify, and authenticate user credentials embedded on the CAC. An enterprise PKI can be a large undertaking, typically requiring new business practices, specialized infrastructure to manage/maintain CACs for government employees, and specialized hardware (such as card readers) across the agency. PKI solutions also generally require specialized middleware to interact with card readers and pass login credentials to downstream applications.

Various implementations provide government agencies with a proven solution for meeting the DOD CAC mandate, while simultaneously simplifying and streamlining the overall login process through a single sign-on ("SSO") feature. SSO allows the user to login one time and, once logged-in, provides the user access to one or more, and possibly all, back-end applications required to perform the user's job. These implementations not only comply with the DOD mandate, but also offer a PKI/SSO solution to seamlessly pass login credentials to back-end applications.

SUMMARY OF THE INVENTION

A mechanism is described for reducing the number of times a user must login to individual services after initially logging into a computer system. In one implementation, a user needs only to login into the computer system, and subsequent requests by the multiple services to have the user login are handled automatically and transparently. Handling of a login request may include bypassing the request or logging-in the user. Such an implementation provides an SSO feature that can increase the efficiency of both the user and the system.

A further mechanism is described for providing an SSO feature that accesses user information from a machine-readable format. In one implementation, a user need only present a card to a card reader and enter a PIN, and the user is given access to all applications, data, and networks that the user has permission to access. In such an implementation, the user is logged-in after presenting the card and a valid PIN, and the system generates a token that is valid for this particular login session of the user. When the user attempts to access a service for which the user has permission to access, the system automatically logs-in the user to the application. In this way, the user is logged into the application without having to manually enter a PIN or other information. Additionally, the system can perform the automatic login for the user for services, such as, for example, applications from a variety of different manufacturers, including legacy applications, web-enabled applications, and COTS applications.

BRIEF DESCRIPTION OF THE DRAWINGS

A more complete understanding of the present invention and advantages thereof may be acquired by referring to the following description taken in conjunction with the accompanying drawings, in which like reference numbers indicate like features, and wherein.

DETAILED DESCRIPTION OF THE PREFERRED EMBODIMENTS

Figure 1:
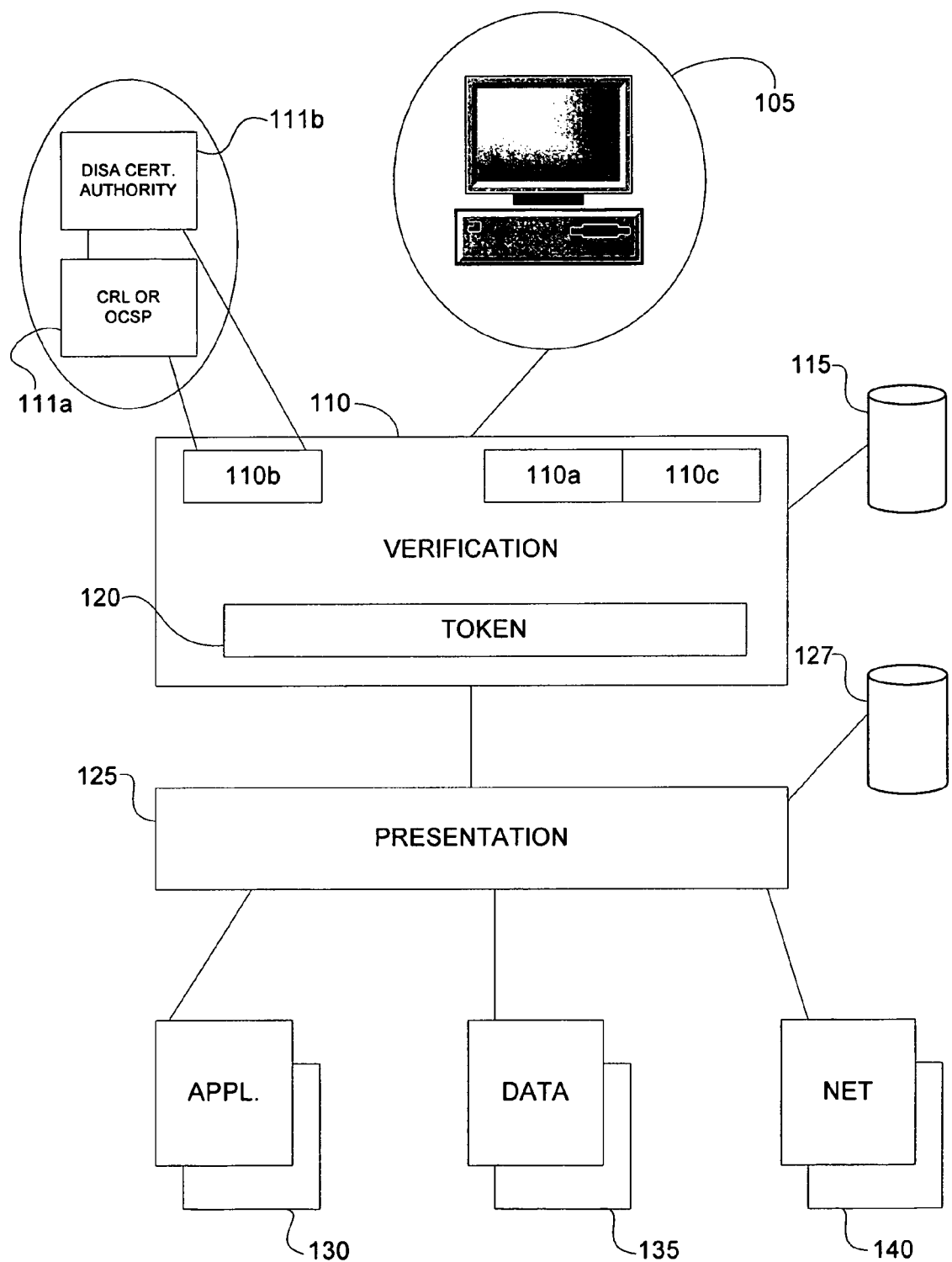
FIGS. 1-2 are schematic diagram of an electronic system for a single sign-on with common access card according to embodiments of the invention.

FIG. 1 is a computer system 100 that provides users with an SSO feature for one or more services. System 100 includes a workstation 105 that accepts a user ID and user password and communicates the user ID and user password to a verification module 110. It should be appreciated that the workstation may include known equipment to receive and process other indicia of the user's identity, such as incorporating (a) a card reader (not displayed) to receive a user's identification card or (b) a biometric reader that accepts the user's fingerprint, retinal scan, or other biometric data. The verification module 110 communicates with an account data store 115 to verify the user ID and user password (or other identifying data), and produces a token 120. A presentation module 125 receives token 120 and communicates with a privileges data store 127 in order to present to the user a representation of the services that the user has rights to access. Presentation module 125 further communicates with one or more services, possibly including one or more applications 130, data elements 135, and networks 140, in order to provide an automatic and user-transparent sign-on for these services using token 120.

In one embodiment, the operation of system 100 in logging a user includes a user enters a user ID and user password at workstation 105. The user ID and user password are provided (operation 1) to the verification module 110. After receiving the user ID and user password, the verification module 110 verifies (operation 2) the user ID and user password by comparing the user ID and user password to information stored on account data store 115. The verification module 110 then creates (operation 3) a token 120 indicating that the user is logged-in to system 100. Token 120 is provided to presentation module 125 which then accesses and displays information from privileges data store 127 indicating the services that the user is permitted to access (operation 4). The display may include one or more services from application(s) 130, data 135, and network(s) 140. Upon selection of one of the displayed services, presentation module 125 logs-in the user to the selected service in an automatic and user-transparent manner.

Workstation 105 is typically a personal computer and allows a user to interface with the verification module 110 in order to enter a user ID and user password or other identifying data. Alternatively, the workstation 105 may include a more advanced or a special-purpose computer, a dumb terminal, a personal digital assistant ("PDA"), a telephone, or another type of data entry device, data manipulation device, or communications device.

The workstation 105 may optionally include a card reader (not shown). The card reader is designed to access information stored on a CAC. The workstation 105 could thus, allow a user to login in at least two ways. In the first, the user presents a CAC and types in a PIN, and in the second the user types in a user ID and a user password. In one implementation, workstation 105 is running ActivCard Gold™ software application, available from ActivCard Corp. in Fremont, Calif., which compares the user's typed-in PIN with an encrypted PIN stored on the CAC to ensure that the two Pins match. Other types of cards and formats may also, or alternatively, be supported for providing information. More generally, the user may provide the information in any supported machine-readable format, which may include biometric formats such as fingerprints and retinal patterns. Thus, in other implementations, another device in the workstation 105 is used in lieu of, or in addition to, a card reader to access a user's information. Other devices may include, for example, a bar code scanner, a fingerprint reader, and a retina scanner.

The verification module 110 is an application running on a host server (not displayed) that is in communication with workstation 105. The verification module 110 receives from workstation 105 the user ID and user password and verifies both the user ID and user password, as explained below. In other implementations, the verification module 110 runs on one or more devices other than a host server, such as, for example, workstation 105 and another workstation (not shown).

Both authentication and access control can be handled at the verification module 110 by a commercially available package such as Netegrity® SITEMINDER, available from Netegrity® Inc. in Waltham, Mass. The verification module 110, also known as a provisioning tool, is used by systems administrators to assign network identities and passwords for access to business applications and Web software. Provisioning tools have become more widely used to automate the process of providing access to business systems and to revoke access when employees leave.

Information to enable authentication and access control such as the user's name, location, telephone number, organization, login identification, password, access privileges to certain resources, physical devices in the network, services available to physical devices, etc. can be retained in a database directory in an account data store 115.

Specifically, in an embodiment of the present invention, the computer system 100 provides users with an SSO feature for one or more services, where the computer system 100 accesses user information stored on a card. Data may be stored directly on an ID card using known techniques, such as incorporating electronic data storage, such as electronically programmable memory (EPROM), into the card itself. In this embodiment, the workstation 105 communicates with the verification module 110 using a card module 110a incorporated within the verification module 110. The card module 110a captures user information accessed by a card reader in the workstation 105.

Card module 110a receives and processes the user information accessed by the card reader of workstation 105. In particular, the user's associated private-key ("PK") certificate is accessed and provided to the verification module 110. The card module 110a accommodates CAC information that is based on an X509 standard. The information accessed may vary depending on the needs of the system, and card module 110a processes the information to make it available to the rest of the verification module 110 and, as needed, the entire computer system 100. Card module 110a may be modified to accommodate different input devices other than a card reader. Card module 110a also accepts the user ID and user password, if a second method of login is used by the user.

The verification module 110 may also include a revocation module 110b that the verification module 110 uses to communicate with a revocation system 111. Specifically, the revocation system 111 may include a list of users and their associated ID cards associated with users that are designated as being prevented from accessing any applications through the computer system 100. The revocation system 111 includes a Certificate Revocation List ("CRL") or Online Certification Status Protocol ("OCSP") module 111a in communication with a certification authority 111b that administers access. In particular, the revocation module 110b interfaces with revocation system 111 to determine if a user's account, or privileges, have been revoked, in which case the user will not be allowed to login.

The Revocation module 110b receives the user's PK certificate from card module 110a and uses revocation system 111 to determine if the PK certificate has been revoked. If the PK certificate has been revoked, then the user's PK certificate will appear in a list of revoked PK certificates in revocation system 111, and the user will not be permitted to login. If the user logs-in by supplying a user ID and user password or other identifying indicia, then the revocation module 110b and revocation system 111 may be bypassed.

The revocation system 111 uses CRL or OCSP module 111a, which uses either CRL or OCSP, for determining if a user's PK certificate has been revoked. The user's PK certificate is presumed to have been stored on the user's card, and also provided to the verification module 110 by the card reader. CRL or OCSP module 111a communicates with certification authority 111b to obtain information on whether the user's PK certificate has been revoked. CRL or OCSP module 111a and certification authority 111b may be implemented, for example, on separate, geographically remote servers, or on the same server as the verification module 110.

The verification module 110 may further include an authentication module 110c that allows the verification module 110 to communicate with an active directory in the accounts data store 115 to verify authenticate the user. If the user's PK certificate has not been revoked, then authentication module 110c accesses the user's PK certificate and uses active directory in the accounts data store 115 to authenticate the PK certificate. To authenticate the user's PK certificate, the authentication module 110c accesses the accounts data store 115 to determine if the PK certificate exists in the accounts data store 115.

Alternatively, if the user provides a user ID and user password in lieu of a card and PIN, then authentication module 110c may authenticate the user ID and user password. To authenticate the user ID and user password, authentication module 110c likewise accesses the accounts data store 115 to verify that the user ID is a valid user ID stored in the accounts data store 115 and that the user password is the correct password for the provided user ID. If the PK certificate, or user ID and user password pair, is authenticated, then authentication module 110c accesses information on the accounts data store 115 to verify that the user is allowed to access the presentation module 125. If the user is allowed to access the presentation module 125, then the verification module 110 logs the user into system 100. In other implementations, revocation module 110b and authentication module 110c may be adapted to verify other forms of identifying information about a user, such as, for example, a clearance level as needed to access stored, confidential data.

The account data store 115 is a data storage device that includes information about the user's identity, including the user's account and password. The verification module 110 accesses information on account data store 115 to verify that the computer system has an account for the user's user ID, and that the user's password is correct. A data storage device may include, for example, any computer-readable medium or format, such as, for example, a hard disk, a compact disc ("CD"), read-only memory ("ROM"), random access memory ("RAM"), and flash memory. The database directory in the account data store 115 can take the form of a lightweight directory access protocol (LDAP) database; however, other directory type databases with other types of schema may be used including relational databases, object-oriented databases, flat files, or other data management systems.

Thus, the account data store 115 is a data store that stores information for authenticating the user's PK certificate, and the user ID and user password. As explained above, to authenticate a PK certificate or a user ID, the account data store 115 is programmed with logic using known database programming techniques to search through the stored records to determine whether the certificate or ID is contained in the stored account data in the account data store 115. Likewise, to authenticate a user password, the account data store 115 performs a look-up based on the user ID. The account data store 115 may be implemented, for example, by "Active Directory®" software in a Windows® environment, by Network Information Services ("NIS") software in a Unix® environment, or by custom software. Active Directory® is available from Microsoft Corp. in Redmond, Wash.

As described in greater detail below, upon receipt, processing, and acceptance of the ID card data, the verification module 110 produces a token 120 which is forwarded to a presentation module 125 to allow the verified user with login-free access to applications specified for that particular user. Specifically, after verifying the user ID and the user password, or otherwise providing adequate identification data, the verification layer 110 generates a token 120. Token 120 is a unique identifier for the user indicating the user has been logged-in to computer system 100. Token 120 is stored on the verification module 110 and is used to provide an automatic and user-transparent login when the user first accesses a service that the user has the right to access. By storing token 120, the verification module 110 may confirm, upon request, that a particular token is, or is not, a currently valid token. The content of a token may be generated, for example, randomly, or according to a defined format. For example, implementations may issue tokens in sequence or use an algorithm to determine whether a token is valid without needing to compare against issued tokens.

In other implementations, token 120 need not be created or stored as a separate entity. For example, token 120 may consist of, or include, pieces of information that reside on the verification module 110 and account data store 115, in which case the verification module 110 may access those pieces of information as needed to provide login to a service. Implementations also may store all or part of token 120 off of the verification module 110 and account data store 115. For example, the verification module 110 may store token 120 on a separate data store (not shown), or may transmit token 120, or the information in token 120, to each service that the user has the right to access. If token 120 or the information in token 120 is transmitted, such transmission may occur, for example, in response to a user's attempt to launch a service or prior to such an attempt in order to allow the service to login the user before the user needs to use the service.

After a successful authentication, the verification module 110 generates the token 120, which is a unique identifier that is only valid for the user's current login session. The verification module 110 maintains a list of currently active/valid tokens, and responds to requests for verification that a particular token is valid. Other implementations may, as explained earlier in the discussion of token 120, generate the content of tokens in various manners and use various techniques for verifying the validity of tokens. Token 120 generally does not include any information identifying the user. In other implementations, however, the token 120 includes the user's PIN, the user ID, the user password, and user IDs and passwords for the various services that the user is allowed to access.

The token 120 is provided to the presentation module and serves as a user's key to the presentation module 125 for the user's current login session. The presentation module 125 is a software application that provides a portal for each user, with each user's portal showing the user all of the applications that the user is allowed to access. The presentation module 125 stores information for each user that indicates the services that the user is allowed to access, and uses this stored information to build each user's portal. In other implementations, the presentation module 125 accesses the privileges data store 127 to determine which services a given user is allowed to access. In further implementations, this information is provided from the privileges data store 127 to the verification module 110 and is included in the token 120. Alternatively, implementations may provide a common portal presentation for all users and simply restrict access to those presented services for which a given user does not have the right to access.

The presentation module 125 displays to the user the various services that the user has rights to access. Services may include, for example, an application, data, and a network. The services are displayed using, for example, an icon or hyperlink in a browser format, such as a portal presentation. The presentation allows the user to select one or more services to use. In other implementations, the services are presented to the user using another medium other than displaying, such as, for example, using an aural presentation over a telephone. In order to display the services, presentation module 125 is in communication with privileges data store 127.

Privileges data store 127 is a data storage device that includes information about the user's privileges in system 100. Presentation module 125 accesses information on the privileges data store 127 to determine the services that the user is allowed to access. The privileges data store 127 stores a list of all services that each user is allowed to access, as well as the user ID and user password, if relevant, for those services. The privileges data store 127 has been described functionally and includes, more generally, performing user administration functions in a network including managing security policies. The privileges data store 127 may also be implemented, for example, by "Active Directory®" software in a Windows® environment, by Network Information Services ("NIS") software in a Unix® environment, or by custom software.

The account data store 115 and the privileges data store 127 may be on the same storage device. In certain implementations, one or more of account data store 115 and privileges data store 127 is integrated into presentation module 125 or the verification module 110. In one such implementation, privileges data store 127 is integrated into, or accessed by, the verification module 110 and token 120 includes an indication of the user ID, user password, and the services that the user has the right to access. In that implementation, presentation module 125 receives token 120 and provides a display of the services indicated in token 120.

Upon selection of a displayed service by the user, presentation module 125 logs the user into the selected service. Presentation module 125 may access login information for the user and service that is accessible from the verification module 110, account data store 115, privileges data store 127, or the service itself. In other implementations, presentation module 125 cooperates with the service to simply bypass the login procedure for the user, with the service either implicitly trusting token 120 as an assurance of the user's identity or communicating with the verification module 110 to verify that token 120 is a valid token.

The services displayed by presentation module 125 may include application(s) 130, which represent one or more applications that the user has the right to access, as determined by the user's privileges, and that require a login in order to access. Applications 130 may include, for example, enterprise resource planning ("ERP") applications, advanced planning systems ("APS") applications, office applications (for example, word processing, spreadsheets, and databases). Applications 130 may be web-based or non-web-based, where the non-web-based applications may be accessed directly or through an intermediary for administering a secure connection such as, for example, a Citrix® interface. Citrix® products are available from Citrix Systems, Inc. in Ft. Lauderdale, Fla.

The services displayed by presentation module 125 may include data 135, which represents data that the user has rights to access, as determined by the user's privileges, and that require a login in order to access. Data 135 may include, for example, financial, procurement, and other business information. Access to data 135 may be provided by, and login effectuated through, for example, a file transfer tool, an application for viewing or manipulating the data, a document management system, and an operating system.

The services displayed by presentation module 125 may include network(s) 140, which represent one or more networks that the user has the right to access, as determined by the user's privileges, and that require a login in order to access. Network(s) 140 may include, for example, a local area network ("LAN"), a wide area network ("WAN"), an intranet, and the Internet. Access to network(s) 140 may be provided by, and login effectuated through, for example, a network bridge, a network management application, and a gateway.

The computer system 100 may be implemented on a single data center that includes one or more servers. The computer system 100 also may be implemented across multiple data centers that are, for example, geographically remote from each other. For example, a system may include a first data center in the United States and a second data center in Europe. In such an implementation, tokens 120 may be created and issued at each data center as users login to the individual data centers. Further, each data center may host its own applications, and as those applications are accessed by users the users' tokens would also be verified locally at each data center. In order to provide an SSO feature across both data centers, each data center also can verify the tokens issued by other data centers. In this way, if a user logs-in to the first data center and desires to use an application at the second data center, the second data center can verify the user's token even though that data center did not issue the token. One mechanism for enabling one data center to verify tokens issued by another data center is to leverage a replication feature in the verification module 110 and which can be built into the verification module 110 that spans all of the data centers. Mechanisms for enabling inter-data center token verification may include, for example, storing at each data center a copy of all of the tokens issued by the other data centers, or requiring each data center to query the other data centers before deciding that a token is not valid.

Figure 2:
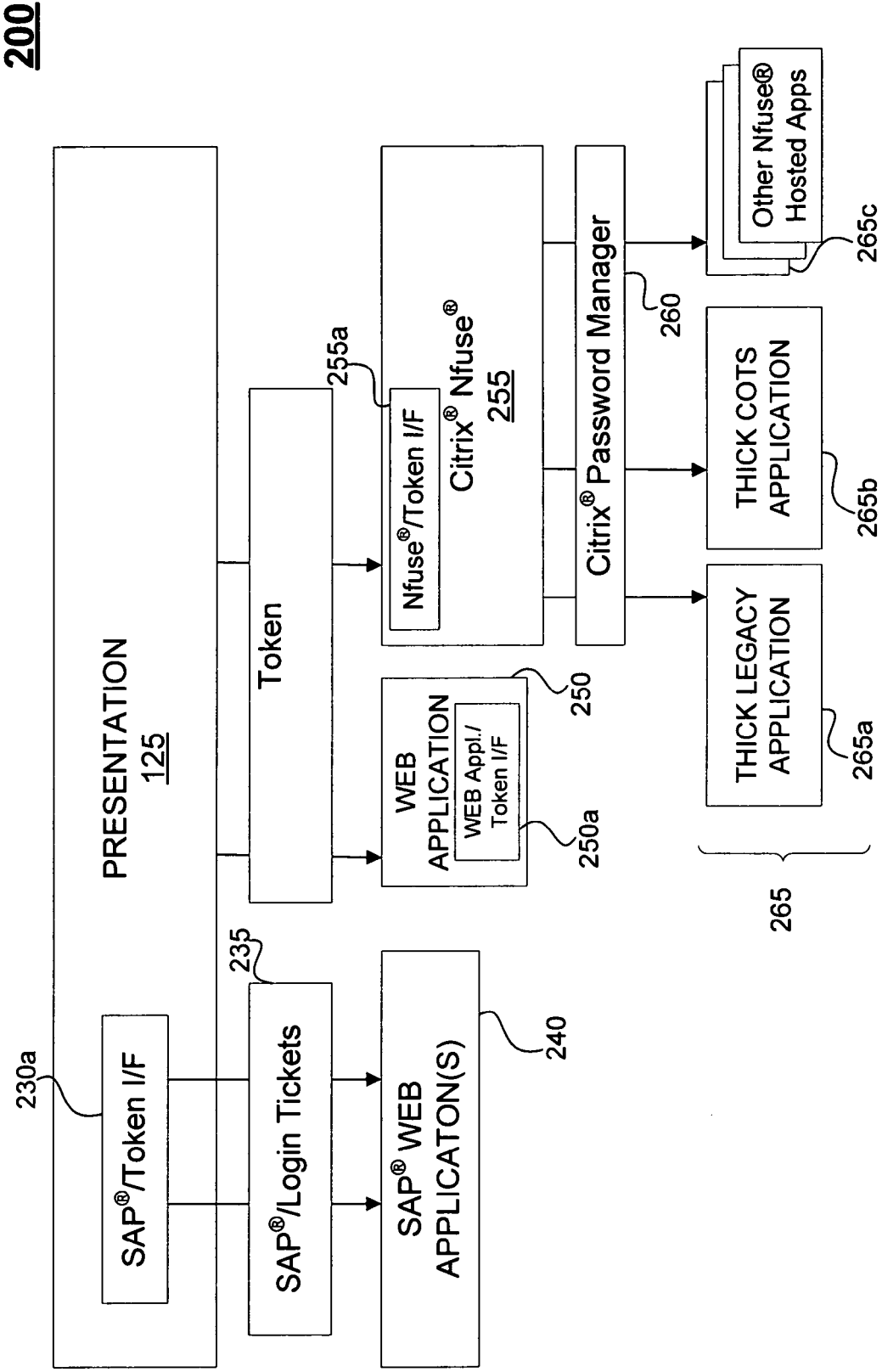

Turning now to FIG. 2, another embodiment of the present invention provides a presentation module 125 that enables two or more application interfaces that use the token 120 to couple the user to multiple different applications.

For example, the presentation module 125 may include a SAP®/token interface 230*a* that communicates with a SAP® Login Tickets ("tickets") module 235. Tickets module 235 further communicates with one or more SAP® web applications 240. Presentation module 125 communicates and shares token 120, with a non-SAP® web application module 250 ("web application module 250") using a web application/token interface 250*a* that is part of web application module 250. Similarly, the presentation module 125 communicates, and shares token 120, with a Citrix® Nfuse® module 255 ("Nfuse® module 255") using an Nfuse®/token interface 255*a* that is part of Nfuse® module 255. NFuse® enables one to integrate interactive applications into standard Web browsers such as Netscape or Microsoft Internet Explorer. NFuse also enables joining several servers in a group to create a server farm. A Citrix MetaFrame Server may be included in the farm or engagement. Within the farm, one can perform load balancing, license pooling, and application publishing.

Nfuse® module 255 further communicates with a CPM 260 which in turn communicates with an application layer 265. Application layer 265 includes a thick legacy application 265*a*, a thick COTS application 265*b*, and one or more other Nfuse®-hosted applications 265*c*. CPM 260 also communicates with the account data store 115 and the privileges data store 127.

The embodiment of FIG. 2 has a presentation module 125 that includes SAP®/token interface 230*a*, which interfaces with tickets module 235 to provide the user access to one or more SAP® web applications in a manner that is automatic and transparent to the user. SAP® products are available from SAP® in Walldorf, Germany. Tickets module 235 implements a standard SAP® service that allows a user to bypass the otherwise required login to SAP® applications. Tickets module 235 (the standard SAP® service) is typically used in systems in which a user has already been required to login to a system using an SAP® window, thus allowing tickets module 235 to assume that a proper login has been achieved. In the implementation of FIG. 2, there is no earlier login through an SAP® window and, accordingly, SAP®/token interface 230a is designed to provide tickets module 235 assurances that a proper login has been achieved.

To provide the assurance, SAP®/token interface 230a verifies that token 120 is still valid by communicating with the verification module 110. After verifying the validity of token 120, SAP®/token interface 230a communicates with tickets module 235 to provide the user access to one or more SAP® web applications 240. SAP® web application(s) 240 may include, for example, SAP® R13®, SAP® Business Warehouse ("BW")™, other ERP applications, and non-ERP applications. The presentation module 125 also provides user information to SAP® web application(s) 240 as needed. For example, the presentation module 125 typically provides SAP® web application(s) 240 with a user role. SAP® web application(s) 240 uses the user role to determine which transactions, or data, the user will be allowed to access from within SAP® web application(s) 240.

The presentation module 125 provides token 120 to web application/token interface 250a in order to bypass the normal requirement to login the user to web application module 250. Web application/token interface 250a verifies that the token is still valid by communicating with the verification module 110, and then allows the user to bypass the login requirement for web application module 250. The presentation module 125 also provides user information to web application module 250, as described above for SAP® web application(s) 240. Web application module 250 may include, for example, Manugistics Supply Chain Planning and Optimization ("SCPO")® software (for example, version 7.1). Manugistics products are available from Manugistics, Inc. in Rockville, Md.

The presentation module 125 also provides token 120 to Nfuse® token interface 255a in order to bypass the normal requirement to login to Nfuse® module 255. Nfuse®/token interface 255a is analogous to web application/token interface 250a. Nfuse® module 255 provides the ability to access applications that are not web-enabled, such as, for example, a thick legacy application, a thick COTS application, and other applications including thin applications. "Thick" applications refer to those applications that install software on a desktop in order to operate, such as in a client-server architecture. "Thin" applications, in contrast, refer to applications that do not need to install software on a desktop with the exception of, for example, cookies. Thin applications include web-enabled applications that are operable over a browser. Thin applications are, thus, easier to deploy than thick applications because software does not need to be installed on each user's workstation. Nfuse® module 255 also provides access to other hosted Nfuse® applications 265c that may include thick applications, thin applications, web-enabled applications, and non-web-enabled applications. Implementations may provide additional interface modules to automatically and transparently bypass, or effectuate, a login process for other services.

CPM 260 implements Citrix® Password Manager™, a standard Citrix® service that allows a user to login to one or more Nfuse®-hosted applications without having to enter the user's login information. CPM 260 logs-in the user by emulating the login procedure with the Nfuse®-hosted application on behalf of the user. To emulate the login procedure, CPM 260 accesses the account data store 115 and the privileges data store 127 to acquire the user ID and user password for an Nfuse®-hosted application and then provides the user ID and user password to the Nfuse®-hosted application. Other implementations may store the user information in an alternate location or provide an interface agent within Nfuse® module 255 to supply the user information to CPM 260. In the implementation shown in FIG. 2, CPM 260 may effectuate a user login to thick legacy application 265a and thick COTS application 265b. Thick legacy application 265a may be, for example, developed in-house, written in common business oriented language ("COBOL"), and running on a mainframe, and thick COTS application 265b also may be written in COBOL and running on a mainframe.

Figure 3:
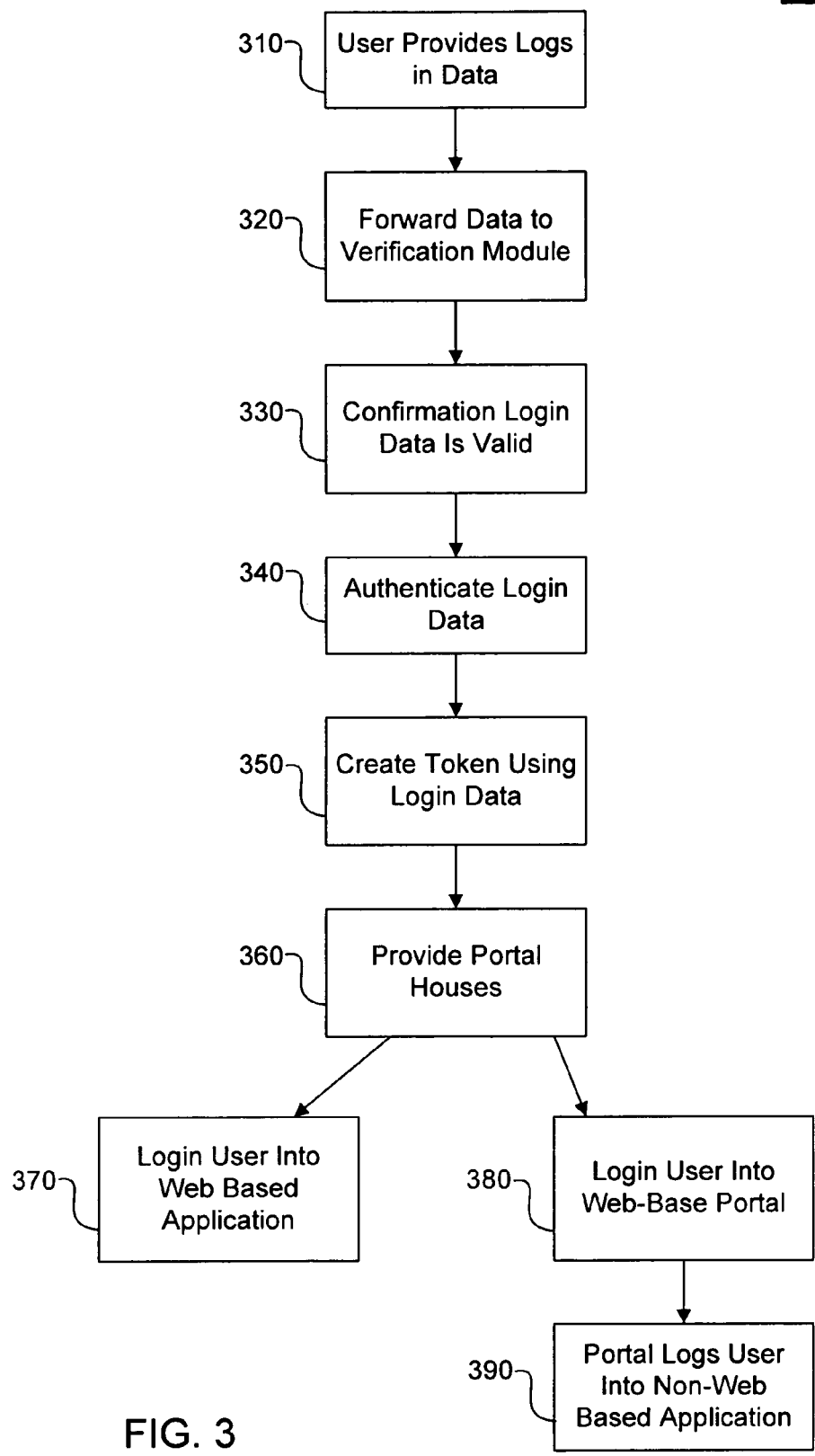
FIG. 3 is a flow chart diagram of the steps in a method for single sign-on with common access card according to embodiments of the invention.

Turning now to FIG. 3, a method 300 for single sign-on with common access card according to embodiments of the invention is provided. The operation of system 100 in logging a user includes a user using workstation 105 to provide login information, step 310. The login information is typically provided by using a card reader to access information on a card and by typing in a PIN, which is verified against information on the card. The user may alternately type in a user ID and a user password.

All or part of the login information is provided in step 320 to the card module 110a on the verification module 110. Assuming that a card was used to provide a PK certificate, the verification module 110 uses revocation module 110b to verify in step 330 that the PK certificate has not been revoked. The verification module 110 then uses authentication module 110c to authenticate in step 340 either the PK certificate or the user ID and user password.

In step 350, the verification module 110 then creates the token and provides the token to the presentation module 125. The presentation module 125 provides an individualized portal presentation for the user that shows the services that the user is allowed to access, in step 360. In step 360, the services are shown to the user using, for example, various graphics, such as icons or hyperlinks, in a browser format. The user may be provided with a variety of applications that may be accessed through a variety of connections types, such as application available over a closed, secure intranet, web-based applications, or through a webpage that provides access to ordinary applications through the web. For example, FIG. 2 depicts that the services presented to the user include one or more SAP® web applications, a non-SAP® web application, and Citrix® Nfuse®.

In response to the user selecting a web-based applications, such as the SAP® web application, in the user's individualized portal presentation, the presentation module 125 bypasses the normal requirement to login to the web-based applications in step 370. For example, the SAP®/token interface 230a verifies the validity of token 120 and communicates with tickets module 235 to bypass the login procedure and to launch the selected web application.

In response to the user selecting a non-web-based application in the user's individualized portal presentation, the presentation module 125 sends token 120 to a web application/token interface of application web interface page, in step 380. In step 380, the Web application/token interface verifies the validity of token and communicates with the presentation module 125 to bypass the normal requirement to login to the web application. The presentation module 125 provides web application/token interface 250a with user information needed to launch the web application for the user in step 390.

For example, in response to the user selecting the Citrix® Nfuse® application in the user's individualized portal presentation, the presentation module 125 sends token 120 to Nfuse®/token interface 255a of Nfuse® module 255. Nfuse®/token interface 255a verifies the validity of token 120 and communicates with the presentation module 125 to bypass the normal requirement to login to the Nfuse® application. Nfuse® module 255 then presents the user with a display showing the applications 265 that are available to the user from within Nfuse® module 255. The available applications 265 include thick legacy application 265a, thick COTS application 265b, and other Nfuse®-hosted applications 265c. In response to the user selecting, for example, thick legacy application 265a in the user's Citrix® display on the individualized portal presentation, CPM 260 communicates with the account data store 115 and the privileges data store 127 to login the user to thick legacy application 265a.

According to one general aspect, a user logs into a computer system and the computer system logs-in the user to an application that is available on the computer system. The login of the user to the application may be automatic and transparent. The login of the user to the application may be in response to the user's initial login to the computer system, or in response to the user's selecting the application after logging-in to the computer system. The computer system may further login the user to additional applications that are available on the computer system. The applications may include multiple applications from a single vendor, applications from multiple vendors, applications that are web-enabled, and applications that are not web-enabled. Information needed to perform the initial login, or to verify that a user should be permitted to login, may be obtained by a user's manual input or from a user's machine-readable card.

According to another general aspect, a user logs-in to a computer system and the computer system bypasses, for the user, a login requirement of an application that is available on the computer system. The bypass may be automatic and transparent. The bypass may be for a thick legacy application or a web-enabled application.

According to another general aspect, a method includes accessing user information pertaining to a user, and logging-in a user to a computer system based on the user information. The method includes receiving a request from the user to access an application on the computer system, the application ordinarily requiring users to login in order to access the application. The method further includes providing the user access to the application in an automated manner such that the user does not have to enter login information in order to access the application.

Providing the user access may include bypassing the application's ordinary requirement that users login, or using stored user information to login the user to the application.

The method may include receiving a second request from the user to access a second application on the computer system, the second application ordinarily requiring users to login in order to access the second application. The method may include providing the user access to the second application in an automated manner such that the user does not have to enter login information in order to access the second application. The application may be provided by a first manufacturer and the second application may be provided by a second manufacturer. The application may be a web-enabled application and, the second application may be a non-web-enabled application.

Accessing user information pertaining to the user may include accessing information from the user's CAC. The method may include providing the user a single sign-on feature for all applications that the user has rights to access on the computer system.

According to another general aspect, a computer system includes a module that verifies information supplied by a user attempting to gain access to a computer system, a token generator coupled to the module, a portal coupled to the token generator, an application interface coupled to the portal, and an application coupled to the application interface. The token generator creates a token for the user after the information is verified. The portal receives the token, presents application information to the user for applications that the user is allowed to access, and allows the user to select an application. The application interface accesses and validates the token. The application provides the user access to the application after the application interface validates the token.

The computer system may include a second application interface coupled to the portal, accessing the token, and validating the token. The computer system may include a second application coupled to the second application interface and providing the user access to the second application after the second application interface validates the token. The application may be a web-enabled application and the second application may be a non-web-enabled application.

The application interface may bypass a login requirement of the application or login the user to the application.

According to another general aspect, a system includes one or more computer-readable media, the media collectively having instructions that when executed on one or more machines result in at least the following: accessing user information pertaining to a user; verifying the user information; logging-in the user to a computer system based on the verified user information; creating a token for the user after logging-in the user; and providing, based on the token, the user access to an application in an automated manner such that the user does not have to enter login information in order to access the application.

The instructions, when executed on the one or more machines, may result in providing, based on the token, the user access to a multiplicity of applications provided by a multiplicity of manufacturers. Accessing user information may include accessing user information provided from a CAC.

The features described above may be implemented on a variety of different platforms, including hardware, firmware, software, and combinations thereof. Various features, or entire implementations, may be written as software instructions that are stored on a computer-readable storage device and executed on a machine such as, for example, a personal computer. Various features and functionality may be, for example, combined, omitted, rearranged, regrouped into different functional units, and augmented with additional features or functionality. The SSO feature may be used to eliminate all additional logins or simply to reduce the number of additional logins required.

We claim:

1. A method comprising:

accessing user information pertaining to a user;

logging-in the user to a computer system based on the user information by verifying the user information at a verification module on a server;

creating a token at the verification module,
  wherein the token is a unique identifier that is only valid for the user's current login session,
  wherein the token is stored on the verification module, and
  wherein the verification module maintains a list of currently valid tokens;

providing the token to a presentation module, wherein the presentation module presents application information to the user for applications that the user is allowed to access and allows the user to select one of the applications that the user is allowed to access;

receiving a request from the user to access a first application on the computer system,
  wherein the first application has a first ordinary login requirement that ordinarily requires users to login in order to access the first application, and
  wherein the first application comprises a first token interface;
in response to receiving the request to access the first application, the presentation module providing the token to the first token interface;
the first token interface verifying the token by communicating with the verification module on the server;
receiving a request from the user to access a second application, the second application having a second ordinary login requirement that ordinarily requires the users to login in order to access the second application;
in response to receiving the request to access the second application, the presentation module providing the token to a second token interface,
  wherein the presentation module comprises the second token interface, and
  wherein the second token interface is coupled to the second application;
the second token interface verifying the token by communicating with the verification module on the server;
in response to the second token interface verifying the token, a ticket module generating a ticket that allows the user to bypass the second ordinary login requirement; and
providing the user access to the first and second applications.

2. The method of claim 1, further comprising:
receiving a request from the user to access a third application on the computer system,
  wherein the third application has a third ordinary login requirement that ordinarily requires users to login in order to access the third application through an application portal, and
  wherein the application portal comprises a third token interface;
in response to receiving the request to access the third application, the presentation module providing the token to the third token interface;
the third token interface verifying the token by communicating with the verification module on the server; and
providing the user access to the third application.

3. The method of claim 1, further comprising using stored user information to login the user to the first and second applications.

4. The method of claim 1, wherein accessing user information pertaining to the user comprises accessing information from a common access card.

5. The method of claim 1, further comprising providing the user a single sign-on feature for all applications that the user has rights to access on the computer system.

6. The method of claim 1, wherein the presentation module provides a common portal presentation to all users of the computer system.

7. A system comprising:
a verification module configured to generate a token after authentication of a user;
a presentation module configured to present application information to the user for applications that the user is allowed to access and configured to allow the user to select one of the applications that the user is allowed to access,
a first application configured to receive the token and to verify the validity of the token by interfacing with the verification module,
  wherein the first application has a first ordinary login requirement that ordinarily requires users to login in order to access the first application, and
  wherein the first application comprises a first token interface configured to provide access to the user based on the verification of the token;
a second token interface coupled to a second application and configured to receive the token, to verify the token by interfacing with the verification module, and to provide access to the user based on the verification of the token;
  wherein the second application has a second ordinary login requirement that ordinarily requires the users to login in order to access the second application, and
  wherein the presentation module comprises the second token interface; and
  wherein the second token interface is coupled to the second application;
a ticket module associated with the second application and coupled to the second token interface,
  wherein the ticket module is further configured to generate a ticket after the second token interface verifies the token,
  wherein the ticket is configured to allow the user to bypass the second ordinary login requirement, and
  wherein the second application is configured to receive the ticket and allow access to the user based on the receipt of the ticket.

8. The system of claim 7, further comprising an application portal comprising a third token interface, the third token interface coupled to a third application and configured to receive the token and to allow the user access to the third application through the application portal based on the receipt of the token.

9. The system of claim 7, wherein the presentation module is configured to provide a common portal presentation to all users of the computer system.

10. The system of claim 7, wherein the token is a unique identifier that is only valid for the user's current login session.

11. The system of claim 7, wherein the token is stored on the verification module, and wherein the verification module maintains a list of currently valid tokens.

12. A computer program product comprising one of more computer-readable media, the media collectively having instructions that when executed on one or more machines result in at least the following:
accessing user information pertaining to a user;
logging-in the user to a computer system based on the user information by verifying the user information at a verification module on a server;
creating a token at the verification module,
  wherein the token is a unique identifier that is only valid for the user's current login session,
  wherein the token is stored on the verification module, and
  wherein the verification module maintains a list of currently valid tokens;
providing the token to a presentation module, wherein the presentation module presents application information to the user for applications that the user is allowed to access and allows the user to select one of the applications that the user is allowed to access;
receiving a request from the user to access a first application on the computer system, wherein the first application has a first ordinary login requirement that ordinarily requires users to login in order to access the first application, and wherein the first application comprises a first token interface;

in response to receiving the request to access the first application, the presentation module providing the token to the first token interface;

the first token interface verifying the token by communicating with the verification module on the server;

receiving a request from the user to access a second application, the second application having a second ordinary login requirement that ordinarily requires the users to login in order to access the second application;

in response to receiving the request to access the second application, the presentation module providing the token to a second token interface, wherein the presentation module comprises the second token interface, and wherein the second token interface is coupled to the second application;

the second token interface verifying the token by communicating with the verification module on the server;

in response to the second token interface verifying the second token, a ticket module generating a ticket that allows the user to bypass the second ordinary login requirement; and providing the user access to the first and second applications.

13. The computer program product of claim 12, wherein the computer-readable media further have instructions that when executed on one or more machines result in at least the following:

receiving a request from the user to access a third application on the computer system, wherein the third application has a third ordinary login requirement that ordinarily requires users to login in order to access the third application through an application portal, and wherein the application portal comprises a third token interface;

in response to receiving the request to access the third application, the presentation module providing the token to the third token interface;

the third token interface verifying the token by communicating with the verification module on the server; and providing the user access to the third application.

14. A method comprising:

accessing user information pertaining to a user;

logging-in the user to a computer system based on the user information by verifying the user information at a verification module on a server;

creating a plurality of tokens at the verification module for accessing a plurality of applications and providing at least one of the tokens to a presentation module;

wherein the presentation module presents application information to the user for applications that the user is allowed to access and allows the user to select one of the applications that the user is allowed to access;

wherein each of the tokens is a unique identifier for allowing access to an application associated therewith; and wherein each of the applications has a token interface associated therewith for token verification, wherein the associated token interface couples the user to a selected application with a coupling that comprises one of the following:

the associated token interface comprises an interface in the selected application;

the associated token interface comprises an interface in the presentation module and is coupled to the selected application through a tickets module that, in response to the token verification, generates a ticket that allows the user to bypass the second ordinary login requirement; and the associated token interface is associated with an application portal coupled to the selected application;

receiving a request from the user to access a first application;

in response to receiving the request to access the first application, the presentation module providing a first token to a first token interface associated with the first application;

the first token interface verifying the first token by communicating with the verification module on the server;

receiving a request from the user to access a second application;

in response to receiving the request to access the second application, the presentation module providing a second token to a second token interface having a different coupling than the first token interface;

the second token interface verifying the second token by communicating with the verification module on the server; and providing the user access to the first and second applications.

15. The method of claim 14, wherein the tokens are stored on the verification module, and wherein the verification module maintains a list of currently valid tokens.

16. The method of claim 14, further comprising using stored user information to login the user to the first and second applications.

17. The method of claim 14, further comprising providing the user a single sign-on feature for all applications that the user has rights to access on the computer system.

18. The method of claim 17, wherein the presentation module provides a common portal presentation to all users of the computer system.

19. A system comprising:

a verification module configured to generate a plurality of tokens for accessing a plurality of applications after authentication of a user, wherein each of the tokens is a unique identifier for allowing access to an application associated therewith, a presentation module configured to present application information to the user for applications that the user is allowed to access and configured to allow the user to select one of the applications that the user is allowed to access, and a plurality of token interfaces associated with the plurality of applications for verifying the plurality of tokens, wherein each of the token interfaces is configured to couple the user to an associated application with a coupling that comprises one of the following:

the associated token interface comprises an interface in the associated application;

the associated token interface comprises an interface in the presentation module and is coupled to the associated application through a tickets module that, in response to token verification, generates a ticket that allows the user to bypass the second ordinary login requirement; and the associated token interface is associated with an application portal coupled to the associated application; and a first token interface associated with a first application configured to receive a token and to verify the validity of the token by interfacing with the verification module; and a second token interface associated with a second application and configured to receive the token, to verify the token by interfacing with the verification module, and to provide access to the user based on the verification of the token, the second token interface having a different coupling than the first token interface.

20. The system of claim 19, wherein the verification module is further configured to store the tokens and to maintain a list of currently valid tokens.

21. The system of claim 19, wherein the presentation module is further configured to provide a common portal presentation to the user.

22. A computer program product comprising one of more computer-readable media, the media collectively having instructions that when executed on one or more machines result in at least the following:

accessing user information pertaining to a user;

logging-in the user to a computer system based on the user information by verifying the user information at a verification module on a server;

creating a plurality of tokens at the verification module for accessing a plurality of applications and providing at least one of the tokens to a presentation module;

wherein the presentation module presents application information to the user for applications that the user is allowed to access and allows the user to select one of the applications that the user is allowed to access;

wherein each of the tokens is a unique identifier for allowing access to an application associated therewith; and wherein each of the applications has a token interface associated therewith for token verification, wherein the associated token interface couples the user to a selected application with a coupling that comprises one of the following:

the associated token interface comprises an interface in the selected application;

the associated token interface comprises an interface in the presentation module and is coupled to the selected application through a tickets module that, in response to the token verification, generates a ticket that allows the user to bypass the second ordinary login requirement; and the associated token interface is associated with an application portal coupled to the selected application;

receiving a request from the user to access a first application;

in response to receiving the request to access the first application, the presentation module providing a first token to a first token interface associated with the first application;

the first token interface verifying the first token by communicating with the verification module on the server;

receiving a request from the user to access a second application;

in response to receiving the request to access the second application, the presentation module providing a second token to a second token interface having a different coupling than the first token interface;

the second token interface verifying the second token by communicating with the verification module on the server; and providing the user access to the first and second applications.

23. The computer program product of claim 22, further comprising instructions that when executed on one or more machines result in storing the tokens on the verification module, wherein the verification module maintains a list of currently valid tokens.

24. The computer program product of claim 22, further comprising instructions that when executed on one or more machines result in providing the user a single sign-on feature for all applications that the user has rights to access on the computer system.

25. The computer program product of claim 22, further comprising instructions that when executed on one or more machines result in the presentation module providing a common portal presentation to all users of the computer system.

* * * * *

UNITED STATES PATENT AND TRADEMARK OFFICE
CERTIFICATE OF CORRECTION

| | | |
|---|---|---|
| PATENT NO. | : 7,818,582 B2 | Page 1 of 1 |
| APPLICATION NO. | : 11/166343 | |
| DATED | : October 19, 2010 | |
| INVENTOR(S) | : Donald E. Marion et al. | |

It is certified that error appears in the above-identified patent and that said Letters Patent is hereby corrected as shown below:

On the Title Page, Item (57), in the Abstract, line 12, "login the user" should read --login for the user--.

In Claim 12, column 14, line 46, "one of more" should read --one or more--.

In Claim 22, column 17, line 20, "one of more" should read --one or more--.

Signed and Sealed this
Twenty-fifth Day of January, 2011

David J. Kappos
*Director of the United States Patent and Trademark Office*